(12) United States Patent
Reed

(10) Patent No.: US 6,439,817 B1
(45) Date of Patent: Aug. 27, 2002

(54) INSERT RETENTION MECHANISM

(76) Inventor: Gary Jack Reed, 1015 S. Soderquist Rd., Turlock, CA (US) 95380

( * ) Notice: Subject to any disclaimer, the term of this patent is extended or adjusted under 35 U.S.C. 154(b) by 0 days.

(21) Appl. No.: 09/813,245

(22) Filed: Mar. 19, 2001

(51) Int. Cl.[7] .................. F16B 37/12; F16B 39/28
(52) U.S. Cl. ................. 411/110; 411/178; 411/321; 411/948
(58) Field of Search ................. 411/109, 110, 411/178, 321, 322, 323, 948

(56) References Cited

U.S. PATENT DOCUMENTS

| | | | |
|---|---|---|---|
| 83,371 | A | 10/1868 | Foster |
| 154,864 | A | 9/1874 | Harvey |
| 250,728 | A | 12/1881 | Harvey |
| 310,462 | A | 1/1885 | Patten |
| 568,277 | A | 9/1896 | Ball |
| 638,326 | A | 12/1899 | Farr |
| 678,814 | A | 7/1901 | Riggs |
| 899,916 | A | 9/1908 | Smith |
| 1,345,425 | A | 7/1920 | Wells |
| 1,408,793 | A | 3/1922 | Anderson, Jr. et al. |
| 1,434,870 | A | 11/1922 | Brubaker, Jr. |
| 1,539,628 | A | 5/1925 | Bayer |
| 1,543,007 | A | 6/1925 | Hanson |
| 1,963,542 | A | 6/1934 | Bergstrom |
| 2,011,484 | A | 8/1935 | Harman |
| 2,121,692 | A | 6/1938 | Hays |
| 2,291,162 | A | 7/1942 | Kirby |
| 2,300,310 | A | 10/1942 | Poeton |
| 2,361,701 | A | 10/1944 | Michaels |
| 2,506,233 | A | 5/1950 | Murphy |
| 2,649,650 | A | 8/1953 | Javor |
| 2,783,811 | A * | 3/1957 | Cummaro .................... 411/109 |
| 2,951,506 | A | 9/1960 | Diperstein |
| 2,998,645 | A | 9/1961 | Diperstein |
| 3,066,400 | A | 12/1962 | Forsythe |
| 3,117,486 | A | 1/1964 | Matthews |
| 3,295,580 | A | 1/1967 | Waltermire |
| 3,371,697 | A * | 3/1968 | James ....................... 411/110 |
| 3,650,309 | A * | 3/1972 | Neuschotz .................. 411/110 |
| 3,660,233 | A | 5/1972 | Dalke et al. |
| 4,074,950 | A | 2/1978 | Holmes |
| 4,165,904 | A | 8/1979 | Reppert |
| 4,271,554 | A | 6/1981 | Grenell |
| 4,295,765 | A | 10/1981 | Burke |
| 4,599,781 | A | 7/1986 | Diperstein |
| 4,662,806 | A | 5/1987 | Reed |
| 4,810,149 | A | 3/1989 | Lee et al. |
| 4,824,279 | A | 4/1989 | Casazza |
| 4,845,828 | A | 7/1989 | Reed |
| 4,892,429 | A | 1/1990 | Giannuzzi |
| 5,033,919 | A | 7/1991 | Choe |
| 5,379,505 | A | 1/1995 | Reed |
| 5,435,678 | A | 7/1995 | Stencel |
| 5,499,892 | A | 3/1996 | Reed |
| 6,048,151 | A * | 4/2000 | Kwee ..................... 411/948 X |

OTHER PUBLICATIONS

Time–Sert and Big–Sert advertisement, Screw Thread Inserts, 1999, entire advertisement.
Keen–Serts advertisement Solid Inserts, 1996, entire advertisement.
Heli–Coil advertisement, Screw Thread Inserts, 1998, entire advertisement.

* cited by examiner

Primary Examiner—Neill Wilson
(74) Attorney, Agent, or Firm—Bernhard Kreten

(57) ABSTRACT

An insert for use in allowing spark plugs, fasteners, couplings for hydraulic fittings and pipe threads of a given dimension to be used in a material.

18 Claims, 7 Drawing Sheets

INSERT RETENTION MECHANISM

FIELD OF THE INVENTION

The following invention relates to generally to thread repairs in machinery, particularly cast metal machines. More specifically, the instant invention is directed to a thread repair sleeve having a substantially cylindrical shape and interior and exterior threads used to replace damaged threads in a casting. The focal point is prevention of removal of the insert once installed.

BACKGROUND OF THE INVENTION

Conventional repair techniques for stripped threads includes retapping the thread. While this type of repair is effective in some situations, grossly damaged threads are usually replaced with new threads defining a larger diameter bore. This, of course, necessitates the utilization of a larger fastener within the newly threaded bore which is undesirable particularly when the element to be inserted within the threaded bore is standardized, such as a spark plug.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| INVENTOR | PATENT NO | ISSUE DATE |
|---|---|---|
| Foster | 83,371 | October 27, 1868 |
| Harvey | 154,864 | September 8, 1874 |
| Harvey | 250,728 | December 13, 1881 |
| Patten | 310,462 | January 6, 1885 |
| Ball | 568,277 | September 22, 1896 |
| Farr | 638,326 | December 5, 1899 |
| Riggs | 678,814 | July 16, 1901 |
| Smith | 899,916 | September 29, 1908 |
| Wells | 1,345,425 | July 6, 1929 |
| Anderson, Jr., et al. | 1,408,793 | March 7, 1922 |
| Brubaker, Jr. | 1,434,870 | November 7, 1922 |
| Bayer | 1,539,628 | May 26, 1925 |
| Hanson | 1,543,007 | June 23, 1925 |
| Bergstrom | 1,963,542 | June 19, 1934 |
| Harmen | 2,011,484 | August 13, 1935 |
| Hays | 2,121,692 | June 21, 1938 |
| Kirby | 2,291,162 | July 28, 1942 |
| Poeton | 2,300,310 | October 27, 1942 |
| Michaels | 2,361,701 | October 31, 1944 |
| Murphy | 2,506,233 | May 2, 1950 |
| Javor | 2,649,650 | August 25, 1953 |
| Diperstein | 2,951,506 | September 6, 1960 |
| Diperstein | 2,998,645 | September 5, 1961 |
| Forsythe | 3,066,400 | December 4, 1962 |
| Matthews | 3,117,486 | January 14, 1964 |
| Waltermire | 3,295,580 | January 3, 1967 |
| Dalke, et al. | 3,660,233 | May 2, 1972 |
| Holmes | 4,074,950 | February 21, 1978 |
| Reppert | 4,165,904 | August 28, 1979 |
| Grenell | 4,271,554 | June 9, 1981 |
| Burke | 4,295,765 | October 20, 1981 |
| Diperstein | 4,599,781 | July 15, 1986 |
| Reed | 4,662,806 | May 5, 1987 |
| Lee, et al. | 4,810,149 | March 7, 1989 |
| Casazza | 4,824,279 | April 25, 1989 |
| Reed | 4,845,828 | July 11, 1989 |
| Giannuzzi | 4,892,429 | January 9, 1990 |
| Choe | 5,033,919 | July 23, 1991 |
| Reed | 5,379,505 | January 10, 1995 |
| Reed | 5,499,892 | March 19, 1996 |

-continued

| INVENTOR | PATENT NO | ISSUE DATE |
|---|---|---|
| FOREIGN PRIOR ART | | |
| Arenz | 350,141 | June, 1931 |
| unknown | 456,481 | December, 1950 |
| Metalock | 154,074 | November, 1953 |
| Betpob | 492,389 | January 22, 1976 |
| Makchmob | 975,270 | November 23, 1982 |

OTHER PRIOR ART (Including Author, Title, Date, Pertinent Pages, Etc.) Time-Sert® and Big-Sert® advertisement, Screw Thread Inserts, 1999, entire advertisement.

Keen-Serts® advertisement, Solid Inserts, 1996, entire advertisement.

Heli-Coil advertisement, Screw Thread Inserts, 1998, entire advertisement.

SUMMARY OF THE INVENTION

The instant invention resolves the problems noted hereinabove and others by the provision of an insert which threads into new threads formed within the bore that is being repaired. The insert is a substantially cylindrical construct having an exterior thread which meshes with the newly threaded bore of the casting and an interior bore having threads complemental to the dimension of the preexisting fastener previously residing within the old bore. In this way, the same sized fastener or spark plug that was installed originally within the metal casting can be used after the repair. Besides fasteners and spark plugs, the insert also finds utility, inter alia, for repairing hydraulic fitting threads, pipe threads and as a blind hole insert.

Moreover, the instant invention addresses and resolves any problems associated with an attempt to subsequently remove the fastener or spark plug after the repair. In some situations, typically harsh operating environments involving corrosion or galvanic attraction between the various components of a system, the mating area between the threads of the fastener or spark plug can become seized to the insert. When this occurs, an attempt to remove the fastener or spark plug can sometimes cause rotation of the insert in conjunction with the fastener or spark plug, thwarting removal of the fastener or the spark plug alone. The probability of this occurring according to the present invention is substantially nil. The solution preferably includes the utilization of both specially formed threads and a shoulder on the insert which is adapted to provide a cylindrical bore strategically located to vertically align with the meshing exterior threads of the insert and the threads formed in the bore of the material being worked on. A top surface of the insert's shoulder includes a cylindrical bore. After the insert has been placed within the material to be repaired, a hole may be drilled extending the cylindrical bore into the juncture of the exterior threads of the insert and the threads of the bore in the material. Finally, a cylindrical pin is driven into the cylindrical bore through the shoulder and into the drilled area of the exterior threads of the insert and the threads of the bore of the material so that the insert will no longer readily move with respect to the material because the flight of the threads of the insert on an exterior surface thereof will be opposed by the placement of the cylindrical pin and its retention by the threads of the bore of the material.

Where the insert already includes a vertical channel defining a thread gap aligned with the cylindrical bore of the insert's shoulder, the drilling step is not mandatory. In this case, driving the cylindrical pin will actually improve insert retention because the threads in the bore contacted by the pin distort and therefore enhance retention of the insert in the bore.

OBJECTS OF THE INVENTION

Accordingly, a primary object of the present invention is to provide a threaded insert which resists removal once installed in a repair.

A further object of the present invention is to provide an insert which is not necessarily used in a repair, but instead provides a material of a different characteristic than the surrounding material within which it is threaded which resists dislodgment once installed. For example, the instant invention can be a relatively hard steel threaded into a relatively soft material such as aluminum to provide superior gripping and a more beneficial characteristic with the fastener or spark plug located within the interior threads of the insert.

A further object of the present invention is to provide a device as characterized above which is easy to install, difficult to remove and durable in construction.

A further object of the present invention is to provide a device as characterized above which is economical to manufacture and provides an economical solution to repairing objects which heretofore had to be discharged as unrepairable.

A further object of the present invention is to provide a device as characterized above which allows a fastener or spark plug of original dimension to be reinstalled in a bore after repair.

A further object of the present invention is to provide a device as characterized above which can be used with other fittings, such as hydraulic or pipe fittings and in blind bores.

A further object of the present invention is to provide a method for repairing or fabricating a receiving area for fasteners or spark plugs which includes the steps of providing a thread within a bore to receive the insert, installing the insert into the threaded bore, fixing the insert into the bore to preclude further rotation, and installing a fastener or spark plug in the bore.

Viewed from a first vantage point, it is an, object of the present invention to provide an insert, comprising, in combination: a sleeve, an exterior thread formed on the sleeve, an interior thread formed in the sleeve, a shoulder on one end of the sleeve, a bore in the shoulder axially aligned with the exterior thread, and a pin passing through the bore.

Viewed from a second vantage point, it is an object of the present invention to provide a method for repairing or fabricating a receiving area for an object, the steps including: providing a thread within a bore to receive an insert, threading the insert into the threaded bore, fixing the insert into the bore to preclude further rotation of the insert, and installing the object in the insert.

Viewed from a third vantage point, it is an object of the present invention to provide a device for providing a lining in an object, comprising, in combination: a sleeve having an exterior diameter substantially complemental to a bore in the object to be lined, a peripheral shoulder emanating from one end of the sleeve, a pin dimensioned to lodge in the shoulder and along an interface between the sleeve and the bore.

Viewed from a fourth vantage point, it is an object of the present invention to provide a sleeve having an interior thread and an exterior thread, the exterior thread includes a vertically aligned clearance to receive a pin therewithin.

Viewed from a fifth vantage point, it is an object of the present invention to provide a n insert, comprising, in combination: a sleeve having interior and exterior threads, a shoulder on one end of the sleeve having a hole passing therethrough, clearance in the exterior threads aligned with the hole, and a pin dimensioned to pass through the hole and reside within the clearance.

These and other objects will be made manifest when considering the following detailed specification when taken in conjunction with the appended drawing Figures.

DESCRIPTION OF PREFERRED EMBODIMENTS

Figure 1:
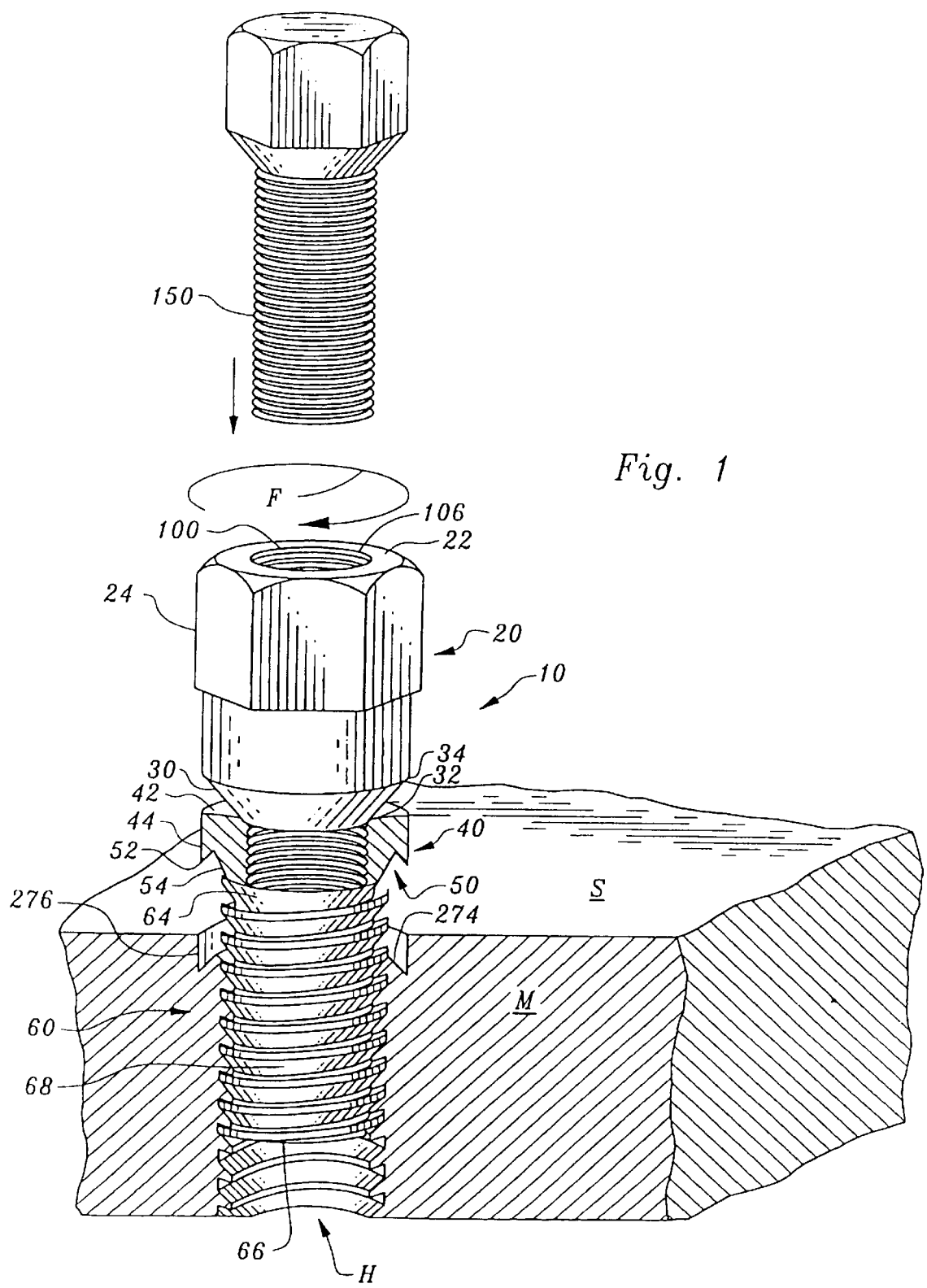
FIG. 1 is a perspective view of the apparatus according to the present invention in its environment.

Considering the drawings, wherein like reference numerals denote like parts throughout the various drawing FIGS. , reference numeral 10 is directed to the thread repair insert according to the present invention.

In essence, and referring to FIGS. 1 through 3, the thread repair insert 10 includes an optional drive head 20 at an uppermost portion thereof, a neck 30 below the drive head 20, a shoulder 40 below the neck 30 and a sleeve 60 extending below the shoulder 40. If there is no drive head 20, there is no need for neck 30. The sleeve 60 includes an exterior threaded portion 62 which extends from an upper portion 64 to a bottom portion 66. The exterior threaded portion 62 includes a plurality of threads 68 thereon which include an upper surface 72 and a lower surface 74 which extend upward toward the head 20 from a minor diameter 69 to a major diameter 70. Thus, a crest 76 of each thread 68 is closer to the head 20 than a portion of the thread 68 between adjacent roots 82 at the minor diameter 69.

The thread repair insert 10 further includes an interior bore 100 extending from a first end 102 to a second end 104. A chamfer 106 is provided on a top surface 22 of the head 20 and provides a transition area between the top surface 22 of the head 20 and the first end 102 of the interior bore 100. Preferably, the interior bore 100 includes a cylindrical side wall 110 which extends between the first end 102 of the interior bore 100 to an area adjacent a top surface 42 of the shoulder 40. The interior bore 100 then transitions to an in-taper 112 which preferably tapers inwardly from the area adjacent the top surface 42 of the shoulder 40 to a start of interior threads 114. The interior threads 114 preferably extend from in-taper 112 to the second end 104 of the interior bore 100. Preferably, the interior threads 114 are of a common type which include an inner diameter 116 and an outer diameter 118. Each thread includes an upper side 120 and a lower side 122.

The neck 30 includes a crease or break-off groove 32 which fractures, shearing the head 20 off of the thread repair insert 10 before a magnitude of torque applied to the insert 10 reaches a maximum torque allowed to be applied to the exterior threads 68. Thus, the head 20 shears off at the break-off groove 32 prior to torsionally over stressing the exterior threads 68. Head 22 is then discarded.

Figure 4:
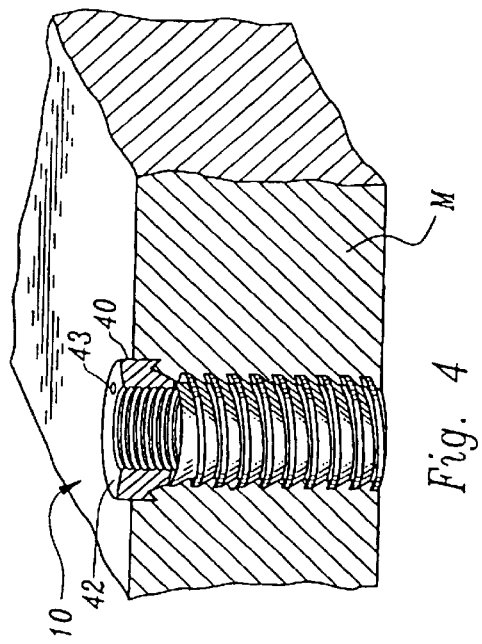
FIG. 4 shows the apparatus according to the present invention during one stage of deployment.

Once the head 22 has been removed at the break off groove 32, the top surface 42 of shoulder 40 is clearly exposed. Please see FIGS. 4 through 6. As shown in FIG. 4, the insert 10 is embedded into the threaded bore of the material M. Removal of the head 22 exposes an area on the top surface 42 that reveals an elongate cylindrical hole 43 (variation 1) passing through the shoulder 40 parallel to but offset from the longitudinal center line 12 of the insert. This cylindrical hole 43 is strategically oriented to pass through a downslope 54 (FIG. 3) which defines a transition from the shoulder 40 to the exterior threads 62 inboard of an upslope 52 of cusp 50. In lieu of a cylindrical hole 43, an imprint 45 (variation 2) may appear on the top surface 42 of shoulder 40 to indicate an area for drilling the cylindrical hole 43. A third variation for locating a hole 43 involves using a peripheral flange 175. Please see FIG. 7. The peripheral flange is provided with at least one guide hole 173 passing through its flange 175 to serve as a support for drilling the hole 43. A stem 177 temporarily locates within the interior threads 114 of the bore 100 to assist in drilling hole 43. In all cases, while one hole and pin is shown, more than one could be deployed.

In any event, once the orientation of FIG. 4 has been achieved and whether the cylindrical hole has been preprovided or must now be provided, it is still desired that a drill pass into the intermeshing threads of both the insert 10 and threads formed on the material M. Once a cylindrical bore has been provided which removes one vertically stacked array of threads underlying the cylindrical bore 43 for both the insert and its host within which it is threaded, a cylindrical pin 47 is driven into the cylindrical hole 43 and into the hole formed between the threads of the insert and the material. The cylindrical pin 47 is quite effective in preventing any unwanted migration of the insert 10 at a future date. Note that because the cylindrical bore 43 and its subsequent penetration into the intermeshing threads is radially offset from the longitudinal axis 12 of the insert 10, a barrier has been provided to preclude further rotation in any direction of the insert relative to the material within which it is threaded. This feature is of considerable significance given the likelihood that once the threaded fastener 150 is lodged within the interior threads of the repair insert 10, subsequent removal of the threaded fastener 150 can occur with nearly total surety that the insert 10 will not become dislodged from its environment.

Figure 2:
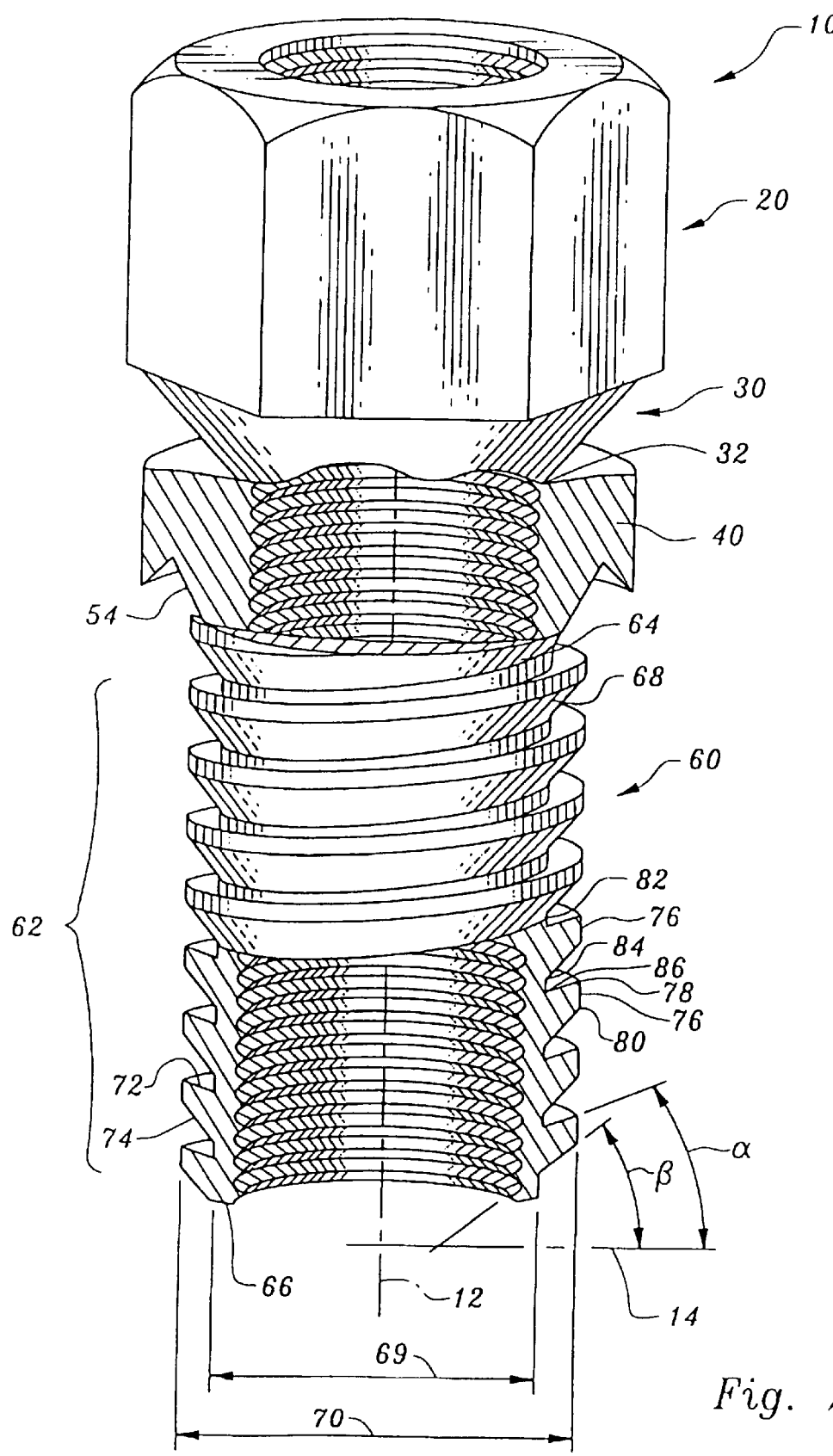
FIG. 2 is a side view of the apparatus according to the present invention.
Figure 3:
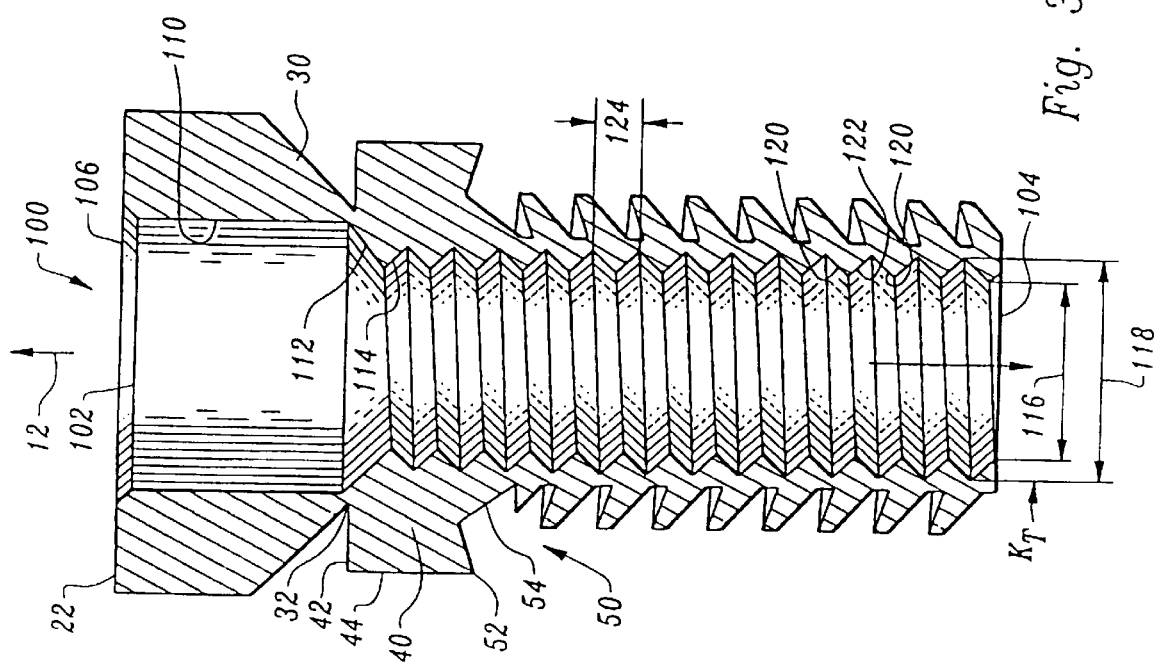
FIG. 3 is a view similar to FIG. 2 showing the interior of the apparatus according to the present invention.

More specifically, and referring in detail to FIGS. 1 through 3, the thread repair insert 10 are shown in detail. The thread repair insert 10 includes the optional head 20 at an uppermost end thereof. The head 20 preferably includes multiple facets 24 arranged to allow a torque applying device to effectively engage the head 20. Preferably, the facets 24 are arranged in a hexagonal pattern to be engaged by a variety of commonly available torque applying tools. Alternatively, various other facet arrangements could be utilized or slots could be provided in the top surface 22 of the head 20 for receiving a screwdriver or other similarly shaped tool. In addition, an internal hex head may be formed on an internal sidewall 110 of the head 20 (FIG. 3). The head 20 is preferably radially symmetrical about a central axis 12 which passes through the thread repair insert 10.

The neck 30 joins the head 20 to the shoulder 40. The neck 30 is preferably arranged as a single frustum with a greater diameter base 34 adjacent the head 20 and a lesser diameter crease or break-off groove 32 adjacent the shoulder 40. The break-off groove 32 and base 34 thus define parallel planes of the frustum of the neck 30. The break-off groove 32 is preferably designed to have a cross-sectional area which is less than a cross-sectional area of almost any other portion of the thread repair insert 10. Thus, when torsional loads increase, the thread repair insert 10 is most likely to fracture at the break-off groove 32 than at any other location along the thread repair insert 10.

In addition, the break-off groove 32 is preferably provided with a cross-sectional area which gives the break-off groove 32 a maximum torsional load characteristic which is less than a torsional load necessary to cause damage to the exterior threads 68 of the exterior threaded portion 62 of the sleeve 60. In this way, if torsional loads on the thread repair insert 10 begin to approach a level which may cause damage to the exterior threads 68 of the exterior threaded portion 62, the break-off groove 32 of the neck 30 will fracture before a damaging torsional load is reached which will damage the threads 68.

The shoulder 40 is interposed substantially between the neck 30 and the sleeve 60. The shoulder 40 includes a top surface 42, a cylindrical side portion 44 and a cusp 50 exposed at a lowermost portion of the shoulder 40. The top surface 42 of the shoulder 40 is adjacent the break-off groove 32 and transitions into the cylindrical side portion 44. The cusp 50 is located at the lowermost portion of the shoulder 40 and includes an upslope 52 which preferably diverges inwardly and upwardly toward the central axis 12 and then transitions into a downslope 54 which preferably diverges inwardly and downwardly toward the central axis 12. The downslope 54 of the cusp 50 transitions into the top 64 of the exterior threaded portion 62 in which the helically wound exterior threads 68 terminate.

The exterior threaded portion 62 of the sleeve 60 is of a substantially cylindrical construct which extends from a location adjacent the downslope 54 of the cusp 50 of the shoulder 40 to the bottom 66 of the sleeve 60. The bottom 66 of the sleeve 60 defines an opposite end of the thread repair insert 10 from the head 20. The exterior threaded portion 62 is oriented about the central axis 12 with the central axis 12 passing through a geometric center of the sleeve 60. The sleeve 60 has the exterior threads 68 formed about the cylindrical surface thereof.

The exterior threads 68 are preferably one continuous helically wound thread which begins at the bottom 66 and spirals up to a top 64. While this single thread design is preferred, other arrangements including a compound series of threads which wind helically together from the bottom 66 to the top 64 could also be utilized.

Referring to FIG. 2, the exterior threads 68 include the crest 76 defining the major diameter 70 of the exterior threads 68. The exterior threads 68 have an upper surface 72 which extends from a bottom edge 86 of a root 82 to an upper edge 78 of the crest 76. The exterior threads 68 also include a lower surface 74 which extends from a top edge 84 of the root 82 to a lower edge 80 of the crest 76. Both the upper surface 72 and the lower surface 74 angle upward toward the head 20 as the surfaces 72, 74 extend from the root 82 to the crest 76. Both the crest 76 and the root 82 exhibit a substantially constant distance from the central axis 12 between the upper edge 78 and the lower edge 80 and between the top edge 84 and the bottom edge 86.

In section, the surfaces 72, 74 extend linearly from the root 82 to the crest 76. However, as this contour is rotated helically about the sleeve 60 along with the threads 68, the upper surface 72 and lower surface 74 take on a curved surface appearance. This appearance is similar to that which would be formed by a linear section of the surface of a cone with a tip of the cone oriented downward and the cone rotated and translated upward along a central axis thereof. The upper surface 72 and the lower surface 74 thus have a curved surface in three dimensions similar to that of a cone, but a linear character when viewed in section.

The upper surface 72 extends from the root 82 to the crest 76 at an upper surface angle α diverging from a reference plane 14 orthogonal to the central axis 12. The upper surface angle α is preferably approximately 20° degrees but could be any angle between 0° degrees and 90° degrees. The lower surface 74 extends from the root 82 to the crest 76 at a lower surface angle β with respect to the reference plane 14. The lower surface angle β is preferably approximately 40°0 degrees but could also vary between 0° degrees and 90° degrees.

Preferably, the upper surface angle α is less than the lower surface angle β such that a thickness of the exterior thread 68 at the crest 76 is less than a thickness of the threads 68 between adjacent roots 82. In this way, the threads 68 are provided with greater thickness, and hence greater strength, adjacent the minor diameter 69 than at the major diameter 70 and are thus more capable of bearing the loads experienced within the threaded hole H. One advantage of having ox less than e is that once the insert bottoms out in a blind bore or once the cusp 50 (at the circle where upslope 52 and side portion 44 join) bites into floor 274 (or surface S if no counter bore), the threads of the insert 10 force the threads of the bore radially inward, which is especially useful in crack repair. This also prevents "upheaval" of material M about a crack. Alternatively, both angles could be parallel to provide similar benefits.

As mentioned, the thread repair insert 10 further includes an interior bore 100 having a first end 102 and a second end 104. Chamfer 106 is provided on the top surface 22 of the head 20 and transitions therefrom to the first end 102 of the interior bore 100. The interior bore 100 then transitions from the first end 102 to taper 112 via a cylindrical sidewall 110. The taper 112 transitions from a greater diameter adjacent the break-off groove 32 of the neck 30 to a lesser diameter adjacent an interior threaded portion which extends from in-taper 112 to the second end 104. The interior threaded portion includes interior threads 114 disposed thereon. The interior threads 114 are preferably of a conventional type and include an inner diameter 116 and an outer diameter 118. In addition, the interior threads 114 are provided with an upper side 120 and a lower side 122.

In use and operation, the first step in repairing a standard threaded hole H is to prepare it for receiving the thread repair insert 10. This is accomplished by removing or drilling out the previous standard threaded fastener which may still be retained within the threaded hole H. Once the standard threaded fastener has been removed or a hole H is provided, a tapping bit is preferably used to form the threads of the hole H complemental to the threads described in conjunction with FIG. 2.

Preferably, the threaded hole H includes the counter bore formed at a transition area between the hole H and the surface S of the material M. The counter bore preferably includes a cylindrical side portion 276 dimensioned similarly to the cylindrical side surface 44 of the shoulder 40. The cylindrical side portion 276 of the counter bore extends from the surface S down to a floor 274 which is preferably cusped. The floor 274 may substantially complement the geometry of the cusp 50 at upslope 52 of the shoulder 40. If upslope 52 and floor 274 are not mutually parallel, metal deformation can occur at the interface, with the softer of the two metals (i.e., the threaded insert 10 or the material M) "flowing" (deforming) into the available space providing a tighter seal.

Figure 11B:
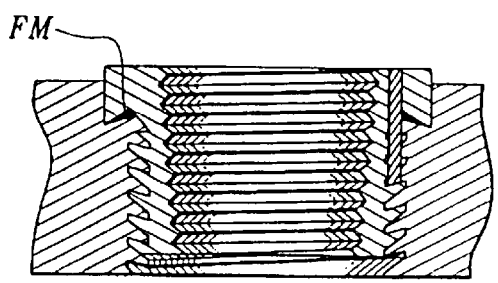
Figure 12:
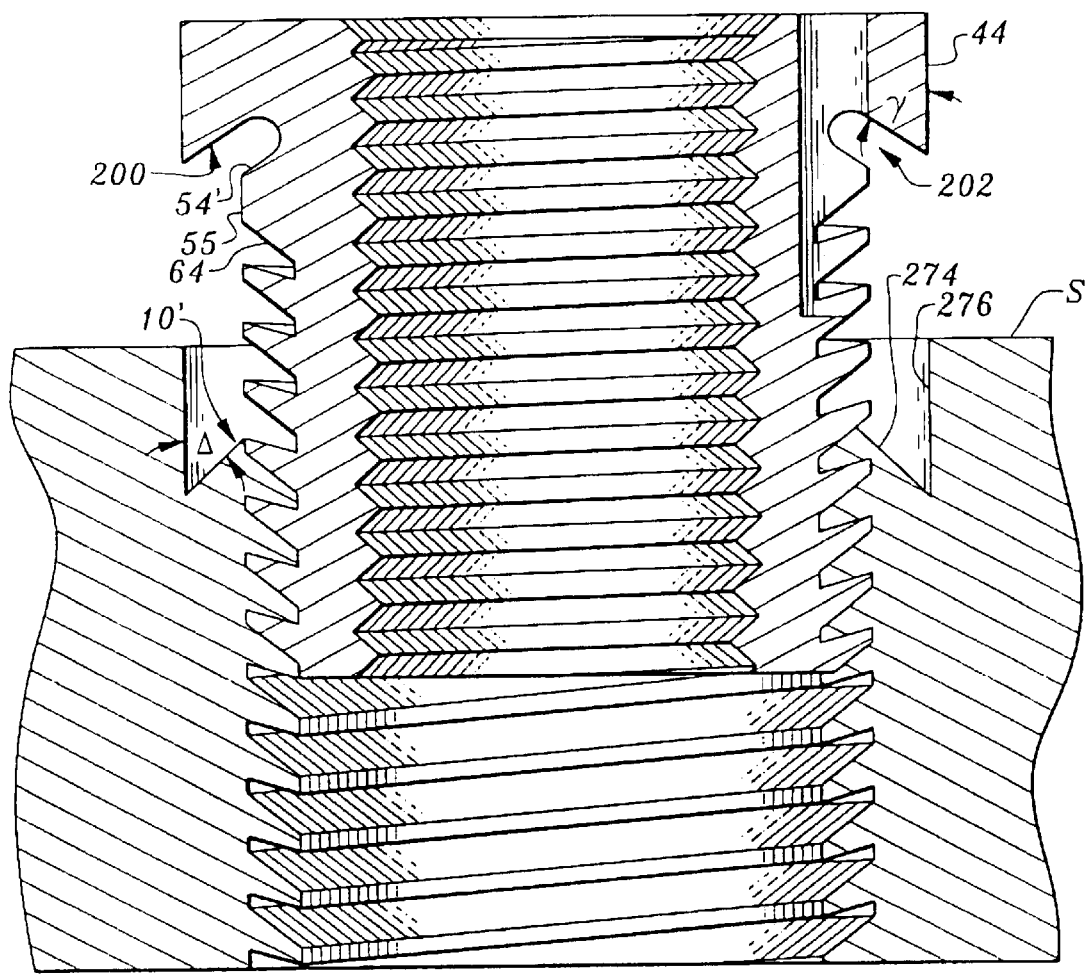
FIG. 12 shows a preferred geometry to cause a seal of the insert once installed by encouraging material deformation and flow.

FIG. 12 provides a sectional close-up of the metal "flow" (deformation) geometry 200. Upslope 52 is shown as preferably having an included angle γ of 45°. Upslope thereafter transitions to a constant radius curved recess 202 which becomes filled with flowing metal FM (e.g. FIGS. 8B, 9B, 10B, 11B) which typically will come from the area 200 in general and from floor 274 "curling" up into the recess 202 in a preferred, particular manner. The preferred angle Δ between side portion 276 and floor 274 is 30°, but as with γ can vary. It is merely preferred that γ>Δ. The "curling" occurs as the insert is being lodged into the material M. Recess 202 includes downslope 54" which transitions to annulus 55 leading to thread top 64.

After the threads T are formed within the threaded hole H and the counter bore has been formed, the thread repair insert 10 is disposed within the threaded hole H. The thread repair insert 10 is disposed within the threaded hole H by applying torque to the drive head 20 causing rotation of the thread repair insert 10 about arrow F (FIG. 1). This rotation causes the upper surface 72 of the exterior threads 68 to slide along the complementally formed threads T of the hole H.

Rotation continues about arrow F until the shoulder 40 abuts against the floor 274 of the counter bore and thus providing a clamping effect (and as mentioned sometimes metal flow or deformation). Once sufficient torque is applied that the neck 30 can no longer resist deformation, the head 20 is severed therefrom at the break-off groove 32. In some instances, no head 20 is provided.

Figures 5, 6, 7:
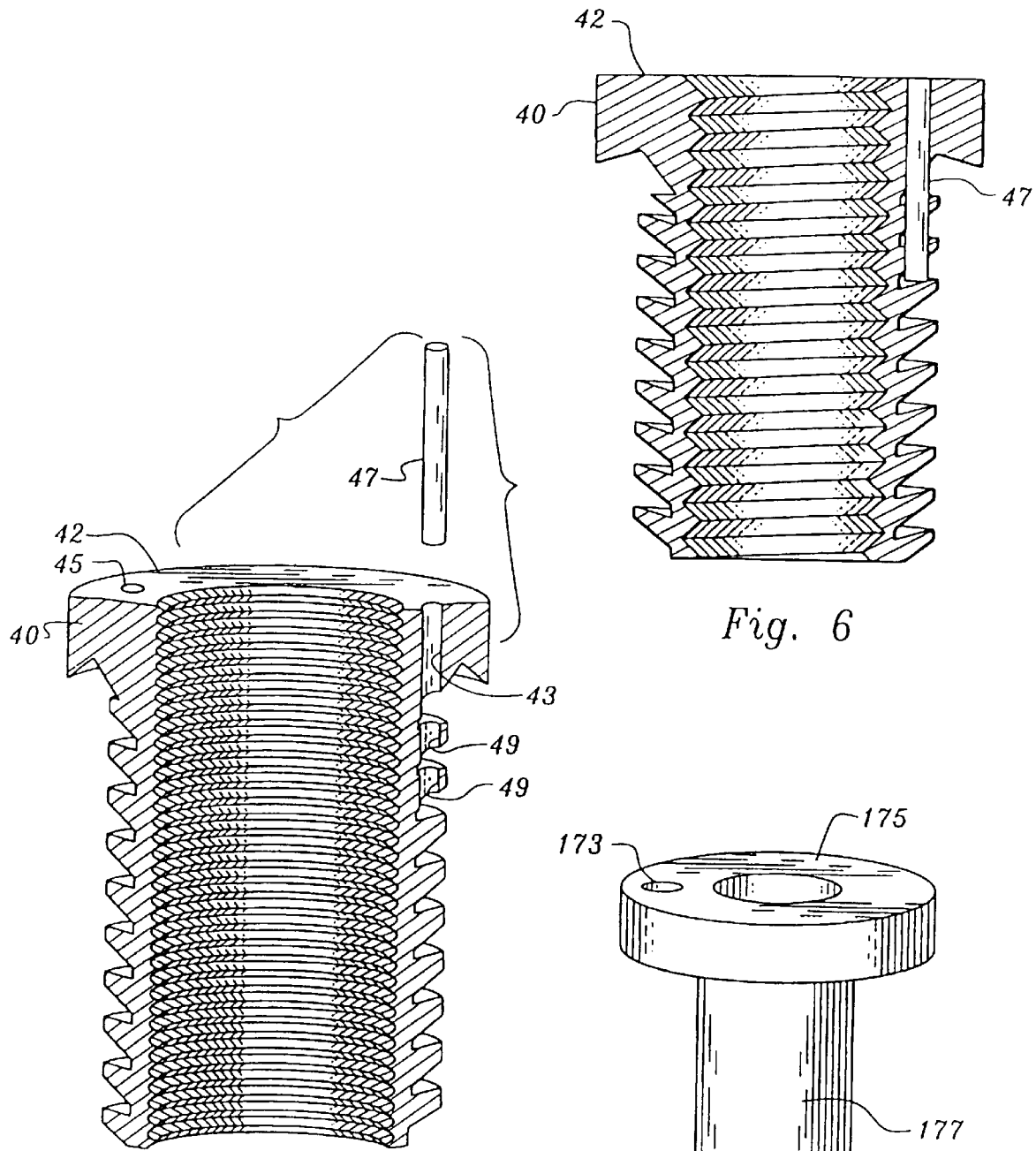
FIG. 5 depicts one operative characteristic of the present invention.
FIG. 6 shows the FIG. 5 view in a different vantage point.
FIG. 7 shows an alignment instrumentality for providing a cylindrical bore for the apparatus according to the present invention.

For example, assume FIGS. 4 and 5 display an article of manufacture, as is, without the head. A bolt threaded into the interior, central core of the insert (such as bolt 150 of FIG. 1) can be used to drive the insert into the material M once the bolt is constrained from rotating within the insert's central threaded core. For, example, the bolt head can abut the top surface 42 of the insert or one of two adjacent nuts threaded onto bolt 150 can abut surface 42 to advance the insert.

While it has been mentioned that the cylindrical locking pin 47 is inserted only after a drill plunges between engaging threads of the bore and insert, it is contemplated that vertically aligned thread portions from the insert 10 could be previously removed (during manufacturing) allowing clearance 49 (FIG. 5) for pin 47 without requiring thread removal from the insert during installation. In actuality, the clearance 49 can be regarded as an interruption of the thread in an area vertically aligned with hole. 43. The clearance length plus the shoulder thickness preferably equals the length of the pin 47. Drilling threads in the bore is not mandatory. Driving the pin into bore 43 will then deform the thread of the material M around the clearance 49 providing even more interference, sealing and resistance from removal.

Figure 8A:
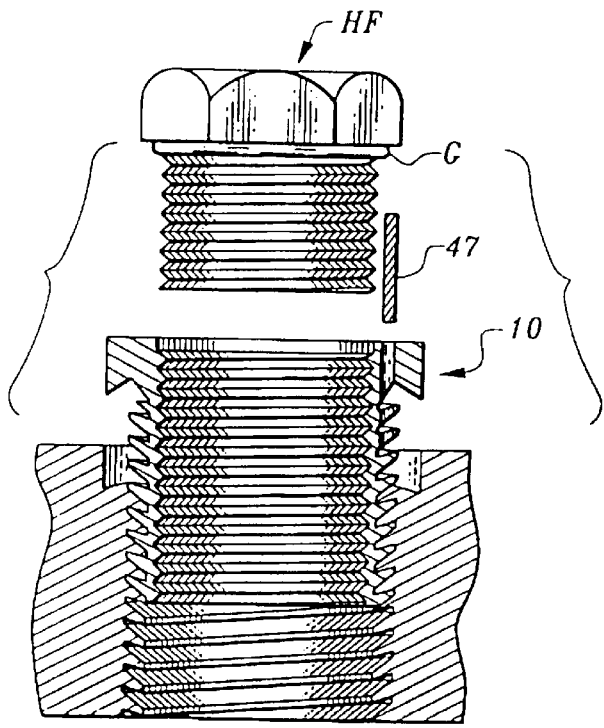
FIGS. 8A and 8B show the insert used in hydraulic fitting thread repair.
Figure 8B:
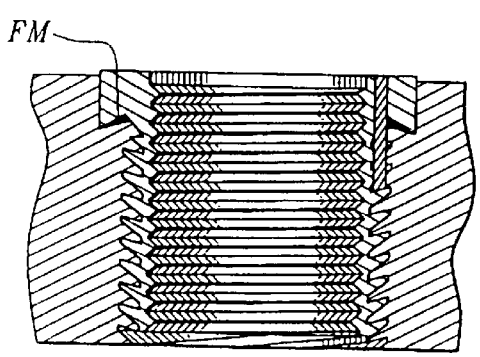

FIGS. 8A and 8B exemplify the headless insert 10 used as a repair for hydraulic fittings HF, which typically use a gasket G. In this embodiment the metal flow FM mentioned with respect to the cusp geometry vis-à-vis the counter bore is mandatory to assume a high pressure seal.

Figure 9A:
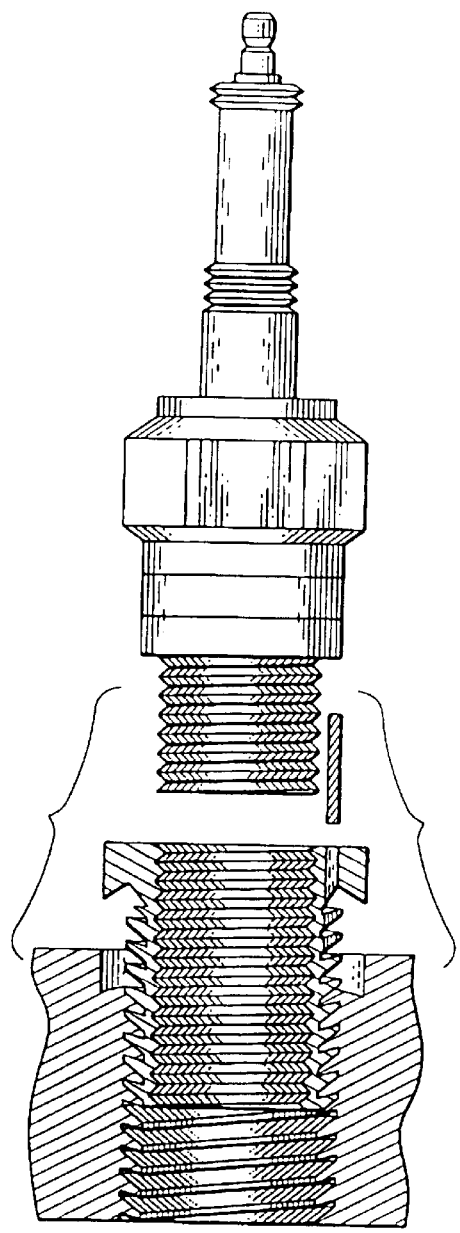
FIGS. 9A and 9B show the insert used in spark plug thread repair.
Figure 9B:
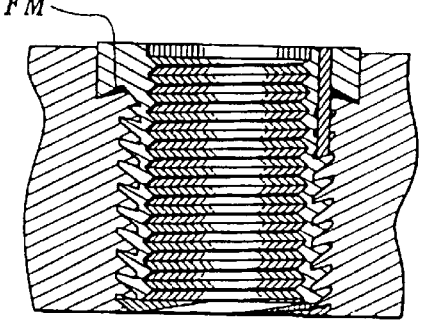

FIGS. 9A and 9B also exemplify the need for metal flow F in the environment of spark plug thread repair. The preferred material for the spark plug insert is hard anodized aluminum, particularly for use with now prevalent aluminum cylinder heads. Hard anodizing thwarts the spark plug from seizing, sticking, bonding or galvanizing to the insert for ease in subsequent removal as in a tune-up.

Figure 10A:
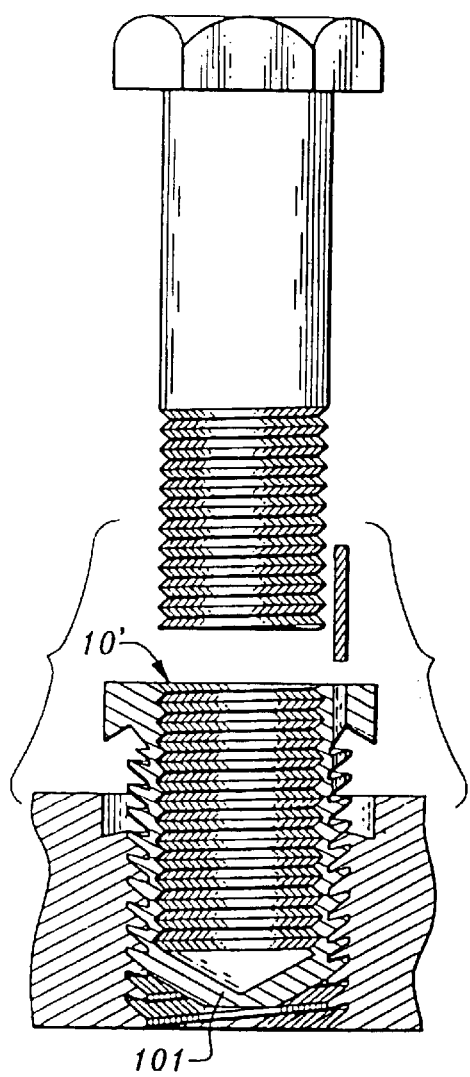
FIGS. 10A and 10B show the insert used as a blind hole insert.
Figure 10B:
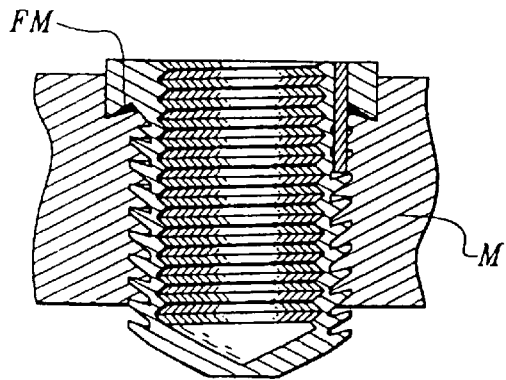

FIGS. 10A and 10B embody an alternative insert 10″ provided with a bottom wall 101 which in conjunction with metal flow FM can be used to seal off an existing hole or repair a crack where the material M is in actuality a housing whose interior needs to remain sealed closed.

Figure 11A:
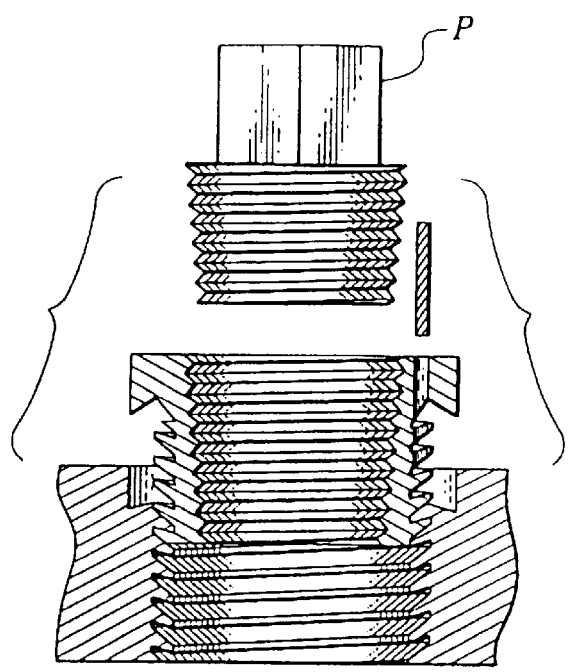
FIGS. 11A and 11B show the insert used in a pipe thread repair.

FIGS. 11A and 11B illustrate an insert used with a pipe thread in which metal flow FM is desired since the pipe plug P (or pipe conduit) requires that the juncture around the insert is fluid impervious.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. An insert, comprising, in combination:
   a sleeve,
   an exterior thread formed on said sleeve,
   an interior thread formed in said sleeve,
   a shoulder on one end of said sleeve,
   a bore in said shoulder axially aligned with said exterior thread, and
   a pin passing through said bore;
   wherein said exterior thread has an upper surface angle less than or equal to a lower surface angle.

2. The insert of claim 1 wherein said exterior thread includes clearance axially aligned with said bore.

3. The insert of claim 2 wherein said pin has a length substantially equal to a shoulder thickness plus clearance length.

4. A device for providing a lining in an object, comprising, in combination:
   a sleeve having an exterior diameter substantially complemental to a bore in the object to be lined,
   a peripheral shoulder emanating from one end of said sleeve,
   a pin dimensioned to lodge in said shoulder and along an interface between said sleeve and the bore including an exterior thread on said device wherein said exterior thread has an upper surface angle less than or equal to a lower surface angle.

5. The device of claim 4 wherein said sleeve has a closed bottom wall.

6. The device of claim 5 wherein said exterior thread includes clearance axially aligned with said bore.

7. The device of claim 6 wherein said pin has a length substantially equal to a shoulder thickness plus clearance length.

8. A sleeve having an interior thread and an exterior thread, said exterior thread includes a vertically aligned clearance to receive a pin therewithin wherein said exterior thread has an upper surface angle less than or equal to a lower surface angle.

9. A sleeve having an interior thread and an exterior thread, said exterior thread includes a vertically aligned clearance to receive a pin therewithin including a shoulder emanating from one end of said sleeve, said shoulder having a cusp on a bottom surface thereof.

10. An insert, comprising, in combination:
    a sleeve having interior and exterior threads,
    a shoulder on one end of said sleeve having a hole passing therethrough,
    clearance in said exterior threads aligned with said hole, and
    a pin dimensioned to pass through said hole and reside within said clearance;
    including sealing means on said insert to provide an impervious barrier.

11. The insert of claim 10 wherein said interior thread receives a spark plug.

12. The insert of claim 10 wherein said interior thread receives a hydraulic fitting.

13. The insert of claim 10 wherein said interior thread receives a pipe coupling.

14. The insert of claim 10 wherein said interior thread is dimensioned to receive a threaded fastener.

15. An insert, comprising, in combination:
    a sleeve having interior and exterior threads,
    a shoulder on one end of said sleeve having a hole passing therethrough,
    clearance in said exterior threads aligned with said hole, and
    a pin dimensioned to pass through said hole and reside within said clearance,
    wherein said shoulder includes means for causing metal deformation upon installation.

16. The insert of claim 15 wherein said sealing means includes means to cause metal flow about said insert.

17. The insert of claim 16 wherein said metal flow causing means includes a recess below said shoulder for receiving metal therein.

18. A method for repairing or fabricating a receiving area for an object, the steps including:
    providing a thread within a bore to receive an insert,
    forming said insert with a shoulder having a cusp on a surface adjacent a length of said insert;
    threading said insert into said threaded bore,
    fixing said insert into said bore by inserting a pin into the bore's and insert's threads to preclude further rotation of said insert,
    and installing the object in said insert.

* * * * *